(12) United States Patent
Jönsson

(10) Patent No.: US 7,470,110 B2
(45) Date of Patent: Dec. 30, 2008

(54) TURBINE OR COMPRESSOR DEVICE AND METHOD FOR ASSEMBLING THE DEVICE

(75) Inventor: Bertil Jönsson, Bjärred (SE)

(73) Assignee: Volvo Aero Corporation, Trollhattan (SE)

( * ) Notice: Subject to any disclaimer, the term of this patent is extended or adjusted under 35 U.S.C. 154(b) by 1159 days.

(21) Appl. No.: 10/605,753

(22) Filed: Oct. 23, 2003

(65) Prior Publication Data

US 2008/0159857 A1 Jul. 3, 2008

Related U.S. Application Data

(63) Continuation of application No. PCT/SE02/00596, filed on Mar. 27, 2002.

(30) Foreign Application Priority Data

Apr. 24, 2001 (SE) .................................... 0101422

(51) Int. Cl.
*F01D 25/00* (2006.01)
(52) U.S. Cl. .................................. 415/216.1; 415/229
(58) Field of Classification Search ................ None
See application file for complete search history.

(56) References Cited

U.S. PATENT DOCUMENTS

| | | | |
|---|---|---|---|
| 3,901,557 A | 8/1975 | Daniels | 308/15 |
| 5,210,945 A | 5/1993 | Suzuki | 29/889.21 |
| 5,433,584 A | 7/1995 | Amin et al. | 415/229 |
| 5,487,640 A | 1/1996 | Shaffer | 415/119 |

FOREIGN PATENT DOCUMENTS

DE 4334339 A1 4/1995

*Primary Examiner*—Richard Edgar
(74) *Attorney, Agent, or Firm*—Novak Druce + Quigg LLP

(57) ABSTRACT

Method and arrangement for providing a turbine or compressor device having a rotor (1), that includes a first rotor section (2) having at least one disc-shaped or annular element (3) which has a multiplicity of blades (4) arranged in series on a circumferential path for guiding a gas flow, and a second, elongate rotor section (5) which projects at right-angles from the rotor disc (3) and which has a rotor shaft (6) connected to the rotor disc. A first and second bearing (8, 9) are fitted at a distance from one another along the rotor shaft (6), and the first bearing (8) is arranged closer to the rotor disc (3) than the second bearing (9). The bearing holder (25) of the first bearing (8) has a greater outside width than other than other components (9, 14, 15, 31) arranged on the rotor shaft (6) between the first bearing (8) and the free end of the rotor shaft (7).

16 Claims, 3 Drawing Sheets

TURBINE OR COMPRESSOR DEVICE AND METHOD FOR ASSEMBLING THE DEVICE

CROSS REFERENCE TO RELATED APPLICATIONS

This present application is a continuation patent application of International Application No. PCT/SE02/00596 filed 27 Mar. 2002 which was published in English pursuant to Article 21(2) of the Patent Cooperation Treaty, and which claims priority to Swedish Application No. 0101422-4 filed 24 Apr. 2001. Both applications are expressly incorporated herein by reference in their entireties.

BACKGROUND OF INVENTION

1. Technical Field

The present invention relates to a turbine or compressor device comprising (including, but not limited to) a rotor having a first rotor section with at least one disc-shaped or annular element. The annular element has a multiplicity of blades arranged in series on a circumferential path for guiding a gas flow, together with a second, elongate rotor section, that projects at right-angles from the rotor disc and which includes a rotor shaft connected to the rotor disc. A first and second bearing are fitted at a distance from one another along the rotor shaft, and the first bearing is arranged closer to the rotor disc than the second bearing. The invention further relates to a method for assembling such a device.

The term turbine device is intended to mean a machine in which the energy present in a flowing fluid (gas, vapor or liquid) is converted into rotational energy by means of blades or vanes. The term compressor device is intended to mean a machine having an inverse function; that is to say, rotational energy is converted by means of blades or vanes into kinetic energy in a fluid. The device comprises a rotor and a stator interacting therewith.

In the following, the device comprises a turbine device, which in turn forms part of a gas turbine. This is a preferred, but in no way restrictive application of the invention. The term gas turbine is intended to mean a unit that at least comprises a turbine wheel and a compressor wheel driven by the former, together with a combustion chamber. Gas turbines are used, for example, as engines for vehicles and aircraft, as prime movers for vessels, and in power stations for generating electricity.

The rotor may take the form both of a radial rotor and an axial rotor. Furthermore, the term elongate rotor section is intended in the context of the present disclosure to mean the rotor shaft and additional components intended to rotate on the rotor shaft, such as bearings and spacers between the bearings and gears.

2. Background Art

When assembling a turbine device comprising the rotor and the stator, the rotor must be balanced. According to the state of the art, the rotor bearings are fitted in their respective bearing positions from different ends of the rotor shaft and the first rotor section has the bladed disc-shaped or annular element which is detachably connected to the rotor shaft by means of a bolted joint, for example. This is done once the bearing that is to be arranged closest to the disc-shaped or annular element has been arranged in the intended position. The balancing is usually performed in a number of stages in which further components, such as spacers between the bearings, gears and other components intended to rotate therewith are successively arranged on the rotor shaft. During balancing, the rotor is rotated by means of a belt or compressed air, for example, and material is removed from, or added to the rotor in order to improve its balance.

Once the rotor has been balanced, it is at least partially dismantled in order to be able to arrange the stator parts at their intended positions around the rotor shaft. In this process of dismantling, the disc-shaped or annular elements, and possibly the bearings, are detached from the rotor shaft. Once the stator parts have been arranged at their intended positions, the rotor is reassembled. This makes it impossible to check how well the rotor is balanced in its final assembled state.

It has been learned (emerged) that despite the balancing that is carried out as described above, a significant proportion of the rotors manufactured in this way still have a certain undesirable imbalance.

SUMMARY OF INVENTION

An object of the invention is to provide turbine and/or compressor devices that, out of manufacture, have a greater proportion of rotors that are of sufficiently high balancing accuracy without further adaptation.

This object is achieved at least in part by the bearing holder of the first bearing having a greater outside width than other components arranged on the rotor shaft between the first bearing and the free end of the rotor shaft. The prerequisites are thereby created for an assembly of the rotor parts, intended to be placed around the rotor shaft, from the free end of the rotor shaft and in towards the rotor disc. This means that any dismantling of the first rotor section, for example, comprising the disc-shaped or annular element is not necessary after balancing. This avoids the risk that, despite the balancing, the rotor, after final assembly, will have an imbalance, which, based on the known art, occurs as a result of the dismantled rotor components not ending up in precisely the same position in the final assembly.

In this way, further bearing housing and/or stator housing parts can easily be fitted in the intended positions by moving in an axial direction from the free end of the rotor shaft and in towards the rotor disc, and then being fixed.

In the context of this disclosure, the term width relates to the dimension at right angles to the longitudinal direction of the rotor shaft and hence primarily to the diameter.

According to a preferred embodiment, the second, elongate rotor section which includes the components, has a width gradually diminishing from the bearing holder of the first bearing towards the free end of the rotor shaft. In this way, bearing housing and/or stator housing parts can be fitted in turn in their intended positions from the rotor disc towards the free end of the rotor shaft by moving in an axial direction from the free end of the rotor shaft and in towards the rotor disc.

According to another preferred embodiment, the device comprises a stator, which in turn comprises a first stator housing part arranged in a position in proximity to the rotor disc, which first stator housing part is designed to be placed and fixed in the position in a direction away from the free end of the rotor shaft.

That is to say, the first stator housing part is accessible for fixing from one side opposite the rotor disc. The prerequisites are thereby created for an assembly of the stator parts, intended for placing around the rotor shaft, one after another from the free end of the rotor shaft and in towards the rotor disc. For this purpose, the first stator housing part has a central opening for slipping over the rotor shaft.

According to a preferred embodiment, the stator comprises a fixed part arranged between the first stator housing part and the rotor disc, to which fixed part the first stator housing part is connected. According to a development, this fixed part comprises a section that forms the bearing holder for the first bearing and is intended to be placed in the intended position together with the bearing.

According to another preferred embodiment, the fixed part comprises means for connection to the first stator housing part in the direction away from the free end of the rotor shaft. The means of connection preferably has a threaded opening, which extends parallel to the longitudinal direction of the rotor shaft. The prerequisites are thereby created for connecting the first stator housing part to the fixed part in an axial direction from outside by means of a bolt, for example.

A further object of the invention is to provide a method for assembling a turbine or compressor device comprising a rotor and a stator, which will result in a greater proportion of the manufactured rotors having a sufficiently high balancing accuracy than is the case according to the present state of the art. According to the method, the stator can be arranged with bearings and other components around the rotor retained after balancing has been carried out. That is to say, no interim dismantling of the rotor is necessary. The first rotor section with the disc-shaped element can thereby be fixed to the rotor shaft by a welded joint, for example. In this context, the term arrangement of the stator relates to the placement and fixation of components forming part of the stator.

According to a preferred embodiment, a second stator housing part is arranged around the rotor shaft through relative movement between the second stator housing part and the rotor shaft. In this way, the second stator housing part is brought from the free end of the rotor shaft and in towards the first stator housing part once the first stator housing part has been arranged in the intended position. That is to say, the components forming part of the stator are in turn moved to their respective intended positions from the free end of the rotor shaft.

BRIEF DESCRIPTION OF DRAWINGS

The invention will be described in more detail below with reference to the exemplary embodiment that is illustrated in the attached drawings, in which.

DETAILED DESCRIPTION

Figure 1:
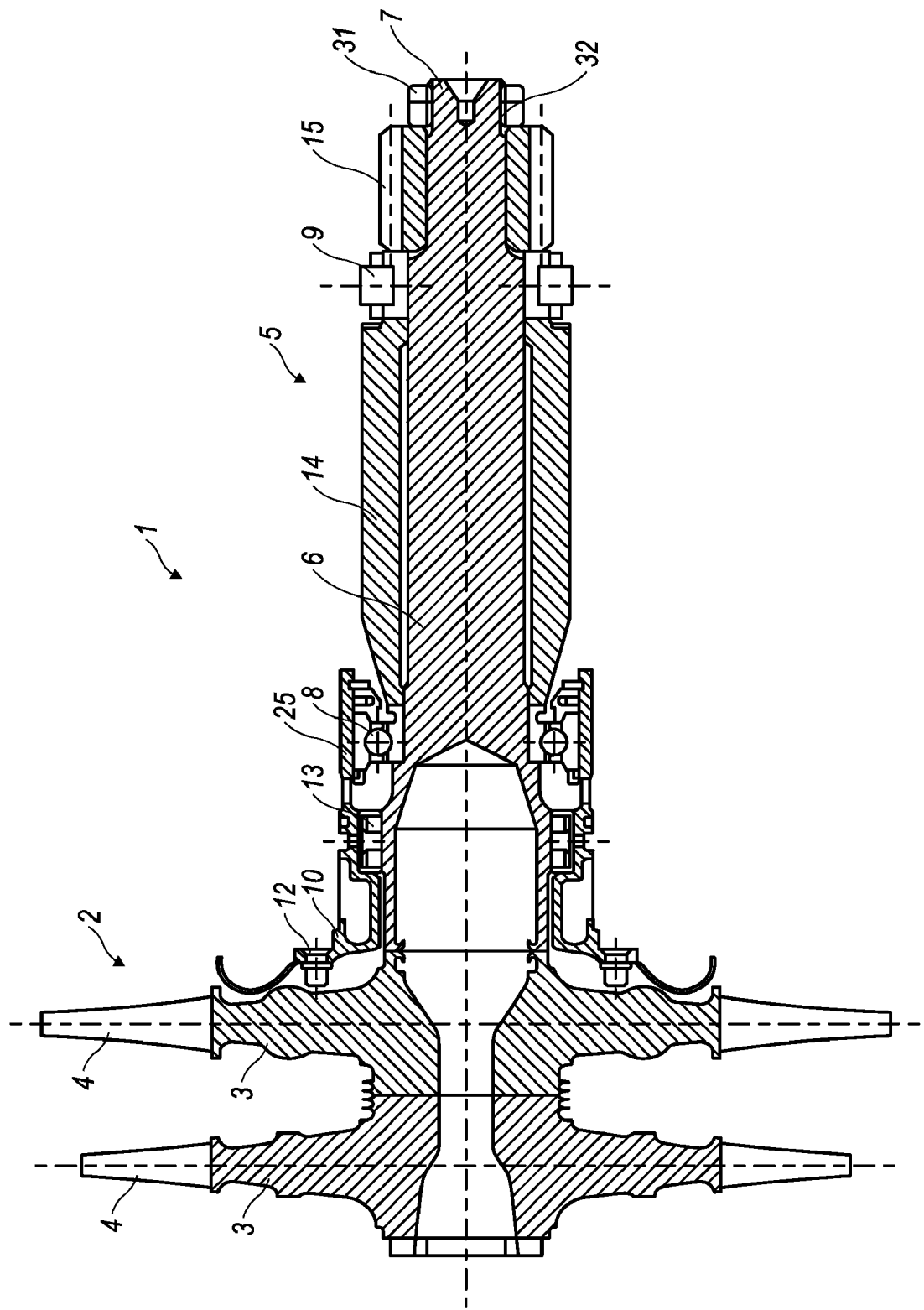
FIG. 1 is a side, cut-away view illustrating a rotor configured according to a first embodiment of the invention.

FIG. 1 shows a rotor 1, which comprises a first rotor section 2 having two disc-shaped or annular elements 3 arranged in series, each of which has a multiplicity of blades or vanes 4 arranged in series on a circumferential path along its periphery. The blades 4 are intended to guide or at least influence a gas flow.

The rotor 1 forms a two-stage axial-flow turbine and is intended for use as a power turbine. The invention is not limited to this embodiment, however, but can also be adapted to axial-flow turbines with different numbers of stages and also to radial-flow turbines.

The rotor 1 further comprises a second, elongate rotor section 5 which projects at right-angles from the rotor discs 3 and which comprises a rotor shaft 6 fixed to these. More specifically, the first rotor section 2 is firmly welded to the rotor shaft 6 and after welding together they thereby form a single part.

The rotor shaft 6 has a diameter gradually diminishing away from the rotor discs 3 and out towards its free end 7. A number of components are arranged along the rotor shaft 6. The design of the rotor shaft 6 with the diameter gradually diminishing means that it is possible to arrange these components in turn one after another at the intended location along the rotor shaft proceeding away from the free end 7 of the rotor shaft 6. When assembling, therefore, the component which is to be arranged closest to the rotor discs is placed in its intended position first.

A first bearing 8 in the form of an axial ball bearing is arranged in a bearing position in proximity to the rotor discs 3. A second bearing 9 in the form of a cylindrical roller bearing is arranged in a bearing position in proximity to the free end 7 of the rotor shaft 6.

Figure 2:
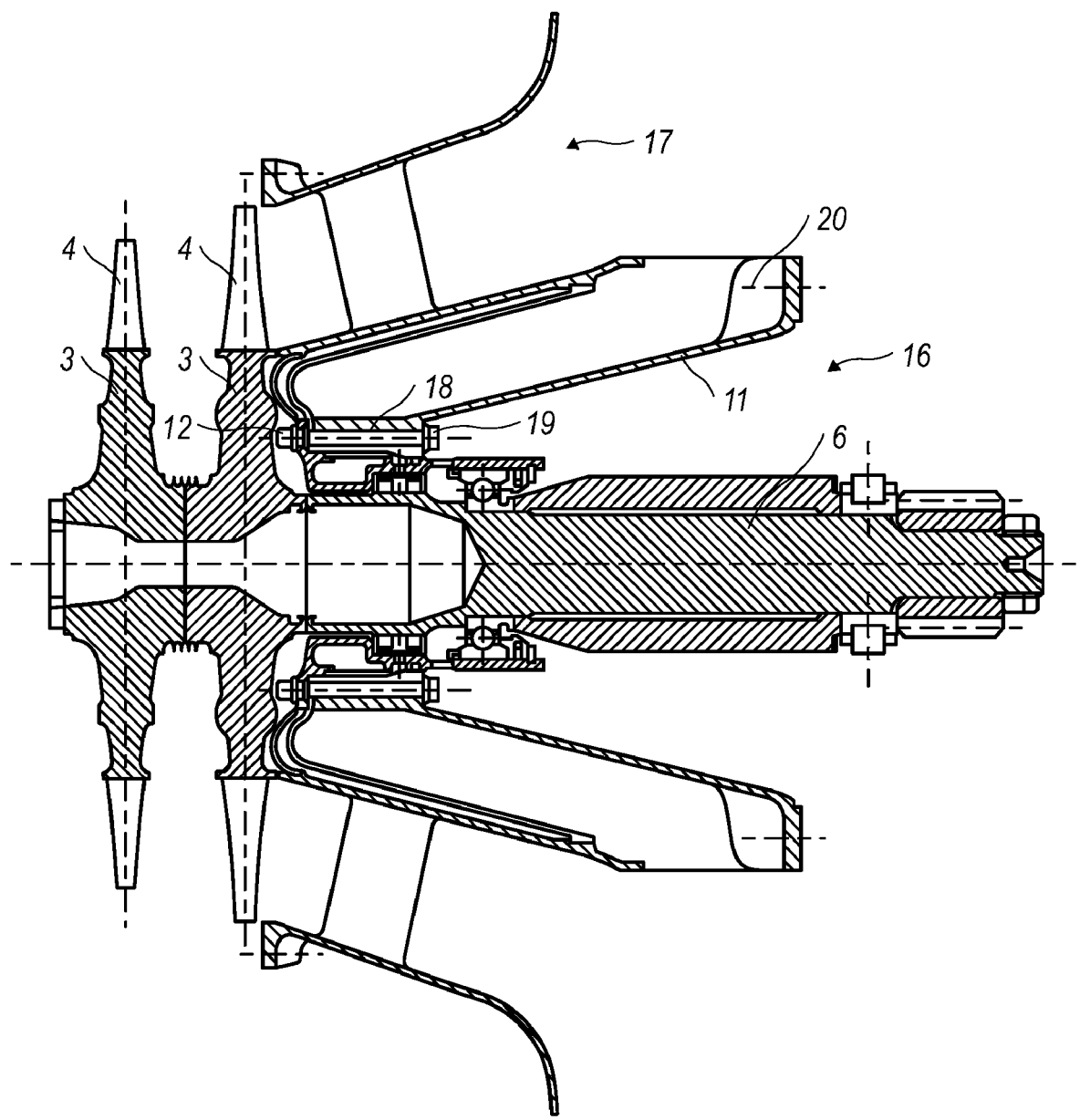
FIG. 2 is a side, cut-away view illustrating the rotor of FIG. 1 with a first stator housing part arranged thereagainst.

A fixed part 10 for connection to a first stator housing part 11, as shown in FIG. 2, is arranged in proximity to the rotor disc 3. The fixed part forms a bearing holder or sleeve 25 for the radial ball bearing 8. The fixed part 10 further comprises means 12 for connection to the first stator housing part 11. The means of connection 12 has a multiplicity of threaded openings, the central axis of which extends essentially parallel to the central axis of the rotor shaft. The means of connection 12 more specifically comprises nut elements for engagement with bolts 19 (see FIG. 2) away from the free end of the rotor shaft. The means of connection 12 is arranged at a greater radial distance from the central axis of the rotor shaft 6 than is the bearing holder 25. The fixed part 12 also comprises support for a seal 13 arranged between the rotor disc 3 and the radial ball bearing 8.

FIG. 1 further shows a spacer element 14 for maintaining a distance between the bearings 8,9 and a gear 15 arranged axially outside the cylindrical roller bearing 9. A stop element 31 in the form of a nut is arranged axially outside the gear 15 for the purpose of keeping the components arranged inside this in the intended locations along the rotor shaft 6. The rotor shaft 6 has an externally threaded section 32 for engagement with the nut 31.

The components along the rotor shaft 6 have a successively reduced diameter in the longitudinal direction of the rotor shaft away from the bearing holder 25 of the first bearing 8 towards the free end 7. The outside diameter of the outer sleeve 25 of the radial ball bearing 8 is therefore greater than the outside diameter of the spacer sleeve 14, which is in turn greater than the outside diameter of the roller bearing 9, which is in turn greater than the outside diameter of the gear 15.

FIG. 2 shows the first stator housing part 11 arranged around the rotor shaft 6. The first stator housing part 11 has a central inner through-hole 16, through which the rotor shaft 6 extends. The first stator housing part 11 furthermore has a duct 17 intended for the passage of gas from the blades 4 of the rotor discs 3.

In addition, the first stator housing part 11 has a multiplicity of holes 18 spaced at a distance from one another on a circumferential path in positions corresponding to the position of the threaded openings 12 of the fixed part 10. The first stator housing part 11 can thereby be connected to the fixed part 10 by the bolts 19. The holes 18 are provided at a shorter distance from the rotor shaft 6 than the gas duct 17 in the radial direction of the rotor shaft. The holes 18 are furthermore accessible in a direction away from the free end 7 of the rotor shaft 6 through the central inner hole 16 in the first stator housing part 11. The central inner hole 16 in the first stator housing part furthermore has a conical shape, which widens towards the free end 7 of the rotor shaft 6. This facilitates manipulation of the bolts 19.

Figure 3:
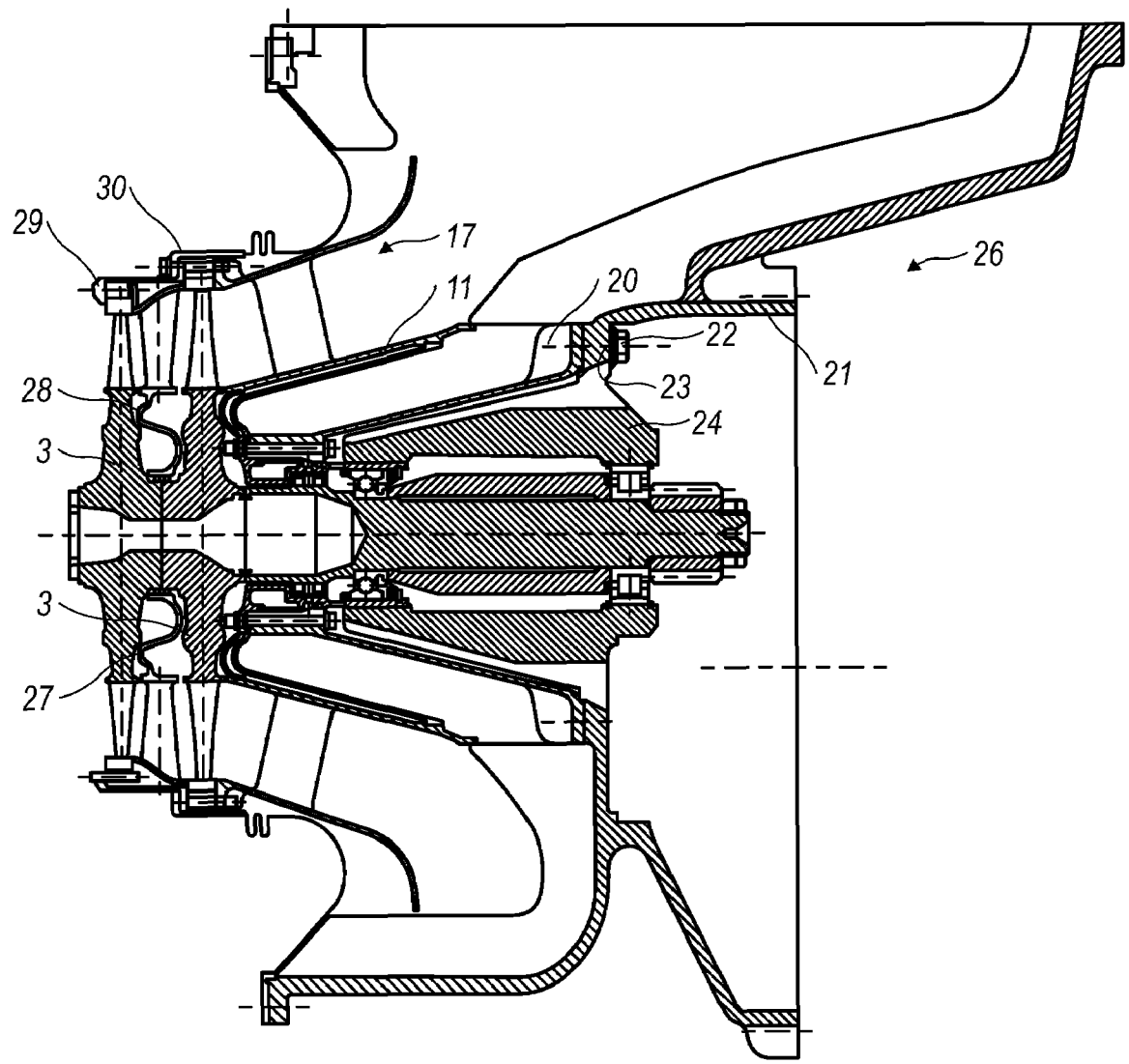
FIG. 3 is a side, cut-away view illustrating a turbine device that includes the arrangement of a rotor and first stator housing part as illustrated in FIG. 2.

The first stator housing part 11 has means 20 of connection to the second stator housing part 21 (see FIG. 3). The means of connection 20 are arranged so that they are accessible in a direction away from the free end 7 of the rotor shaft 6 and consist of a multiplicity of threaded holes intended to receive a corresponding number of bolts 22. The holes 20 are spaced at a distance from one another on a circumferential path in a part of the first stator housing part that faces the free end 7 of the rotor shaft. These holes 20 extend in a longitudinal direction parallel to the longitudinal direction of the rotor shaft 6.

FIG. 3 shows the stator 26 of the turbine device. The second stator housing part 21 is arranged on an opposite side of the first stator housing part 11 to the rotor disc 3. The second stator housing part 21 comprises means 23 for connection to the first stator housing part 11. The means of connection 23 are arranged so that they are accessible from the free end 7 of the rotor shaft 6 and consist of a multiplicity of threaded holes intended to receive the bolts 22. The holes 23 are spaced at a distance from one another on a circumferential path in a part of the second stator housing part 21 which faces the free end 7 of the rotor shaft and in positions corresponding to the positions of the holes 20 in the first stator housing part 11. These holes 23, too, extend in a longitudinal direction parallel to the longitudinal direction of the rotor shaft 6.

The second stator housing part 21 forms a bearing housing 24 for both the radial ball bearing 8 and the roller bearing 9. The bearing housing 24 is arranged at least partially in the inner central hole 16 of the first stator housing part 11.

A third and a fourth stator part 27,28 are arranged between the rotor wheels 3. Furthermore, an outer stator cylinder 29 is arranged radially outside these in order to keep them in their intended location. The third and fourth stator parts 27,28 are designed to be placed between the wheels 3 radially from outside. That is to say, they are brought together from different directions into their intended positions. The stator cylinder 29 is in turn connected to the first stator part by a bolted joint 30 radially outside the gas duct 17.

An example of the assembly of the turbine device is described in chronological order below as shown in the FIGS. 1-3.

The first rotor section 2, including the bladed rotor discs 3, is fixed to the rotor shaft 6 by a welded joint before assembly commences. The radial ball bearing 8 together with the fixed part 10 and the seal 13 are brought from the free end 7 of the rotor shaft 6 towards the rotor discs 3 into their intended position in proximity to the rotor discs 3, see FIG. 1. The spacer sleeve 14 is then similarly placed in the intended position around the rotor shaft 6 up against the radial ball bearing 8. The cylindrical roller bearing 9 is then similarly placed in its intended position up against the spacer sleeve 14. The gear 15 is then similarly placed in its intended position up against the roller bearing 9. The nut 31 is then threaded tight into the intended position along the rotor shaft. Balancing of the rotor is performed once all the components have been fitted on to the rotor shaft. According to one alternative, the rotor is balanced in a number of stages during the assembly described above.

After assembly and balancing of the rotor 1, the first stator housing part 11 is brought from the free end 7 of the rotor shaft 6 in towards the rotor discs 3 into the intended position up against the fixed part 10. The first stator housing part 11 is then fastened to the fixed part 10 by a bolted joint 12,18,19. The conical inner surface of the inner central hole 16 of the first stator housing part 11 means that the connecting holes 18 are readily accessible for introducing and fastening the bolts 19 (see FIG. 2). The second stator part 21 is then brought from the free end 7 of the rotor shaft 6 in towards the first stator part 11 into the intended position up against the former, at least partially in the central hole 16 (see FIG. 3). The second stator housing part 21 is then fastened to the first stator housing part 11 by a bolted joint 20,22,23.

The third and fourth stator parts 27,28 are placed between the wheels 3, radially from outside. That is to say, they are brought together from different directions into their intended positions up against one another. The stator cylinder 29 is then brought in an axial direction into its intended position up against the first stator housing part 11 and connected to this by the bolted joint 30.

The invention must not be seen as being limited to the exemplary embodiments described above, a number of further variants and modifications being feasible within the scope of the claims below.

The means of connection 12,18,19,20,22,23 may be designed in a multiplicity of different ways in order to achieve the connection between the fixed part 10 and the first stator housing part 11 or the first stator housing part 11 and the second stator housing part 21. The fixed part may, for example, have projecting bolts, the first stator housing part having corresponding openings, the first stator housing part being fastened to the fixed part by nuts axially from outside. According to a further alternative, the parts are firmly riveted to one another.

The rotor 1 can naturally also be used both as a compressor and as a turbine, that is to say, both in order to influence or guide a flow and to be acted upon by a flow, without departing from the scope of the following claims.

The invention claimed is:

1. A turbine or compressor device comprising:
a rotor (1) including a first rotor section (2) having at least one disc-shaped or annular element (3) which has a multiplicity of blades (4) arranged in series on a circumferential path for guiding a gas flow, and a second, elongate rotor section (5), which projects at right-angles from the rotor disc (3) and which comprises a rotor shaft (6) connected to the rotor disc;
a first and second bearing (8,9) fitted at a distance from one another along the rotor shaft (6), the first bearing (8) being arranged closer to the rotor disc (3) than the second bearing (9) and wherein a bearing holder (25) of the first bearing (8) has a greater outside width than other components (9, 14, 15, 31) arranged on the rotor shaft (6) between the first bearing (8) and a free end of the rotor shaft (7); and
a stator (26) comprising a series of blades or vanes and having a first stator housing part (11) arranged in a position proximate to the rotor disc (3), the first stator housing part being configured to be placed and fixed in position in a direction away from the free end (7) of the rotor shaft (6).

2. The device as recited in claim 1, wherein the bearing holder (25) of the first bearing (8) and the second, elongate rotor section (5), including the other components (9, 14, 15, 31), has a width gradually diminishing towards the free end (7) of the rotor shaft (6).

3. The device as recited in claim 1, wherein the first stator housing part (11) comprises a duct (17) configured for the passage of gas from the blades (4) of the rotor disc (3).

4. The device as recited in claim 1, wherein the stator (26) comprises a second stator housing part (21) arranged on an opposite side of the first stator housing part (11) to the rotor disc (3) and the second stator housing part configured for connection to the first stator housing part.

5. A turbine or compressor device comprising:
   a rotor (1) including a first rotor section (2) having at least one disc-shaped or annular element (3) which has a multiplicity of blades (4) arranged in series on a circumferential path for guiding a gas flow, and a second, elongate rotor section (5), which projects at right-angles from the rotor disc (3) and which comprises a rotor shaft (6) connected to the rotor disc;
   a first and second bearing (8,9) fitted at a distance from one another along the rotor shaft (6), the first bearing (8) being arranged closer to the rotor disc (3) than the second bearing (9) and wherein a bearing holder (25) of the first bearing (8) has a greater outside width than other components (9, 14, 15, 31) arranged on the rotor shaft (6) between the first bearing (8) and a free end of the rotor shaft (7); and
   a stator (26) having a first stator housing part (11) arranged in a position proximate to the rotor disc (3), the first stator housing part being configured to be placed and fixed in position in a direction away from the free end (7) of the rotor shaft (6);
   wherein the stator (26) comprises a fixed part (10) arranged between the first stator housing part (11) and the rotor disc (3), and to which the first stator housing part is connected.

6. The device as recited in claim 5, wherein the fixed part (10) comprises means (12) for connection to the first stator housing part (11) in the direction away from the free end (7) of the rotor shaft (6).

7. The device as recited in claim 6, wherein the means of connection (12) is arranged radially inside the gas duct (17).

8. The device as recited in claim 6, wherein the means of connection (12) has a threaded opening.

9. The device as recited in claim 5, wherein the fixed part (10) comprises a section that forms the bearing holder (25) for the first bearing (8).

10. A turbine or compressor device comprising:
    a rotor (1) including a first rotor section (2) having at least one disc-shaped or annular element (3) which has a multiplicity of blades (4) arranged in series on a circumferential path for guiding a gas flow, and a second, elongate rotor section (5), which projects at right-angles from the rotor disc (3) and which comprises a rotor shaft (6) connected to the rotor disc;
    a first and second bearing (8,9) fitted at a distance from one another along the rotor shaft (6), the first bearing (8) being arranged closer to the rotor disc (3) than the second bearing (9) and wherein a bearing holder (25) of the first bearing (8) has a greater outside width than other components (9, 14, 15, 31) arranged on the rotor shaft (6) between the first bearing (8) and a free end of the rotor shaft (7); and
    a stator (26) having a first stator housing part (11) arranged in a position proximate to the rotor disc (3), the first stator housing part being configured to be placed and fixed in position in a direction away from the free end (7) of the rotor shaft (6);
    wherein the stator (26) comprises a second stator housing part (21) arranged on an opposite side of the first stator housing part (11) to the rotor disc (3) and the second stator housing part configured for connection to the first stator housing part; and
    wherein the second stator housing part (21) forms a bearing housing for the first bearing (8) and the second bearing (9).

11. A method for assembling a turbine or compressor device that comprises a rotor (1) and a stator (26), and in which the rotor comprises a first rotor section (2) having at least one disc-shaped or annular element (3) with a multiplicity of blades (4) arranged in series on a circumferential path for guiding a gas flow, and a rotor shaft (6) projecting at right-angles from the disc, two bearings (8, 9), and any other components being arranged around the rotor shaft (6), and the rotor then balanced, said method comprising:
    bringing the first stator housing part from a free end (7) of the rotor shaft in towards the rotor disc after a balancing of the first stator housing part (11) of the stator (26) is affected by arrangement around the rotor shaft (6) in a position in proximity to the rotor disc (3) through a relative movement between the first stator housing part and the rotor shaft.

12. The method as recited in claim 11, further comprising arranging a fixed part (10) intended for the first stator housing part (11) around the rotor shaft (6) in proximity to the rotor disc (3) before the first stator housing part (11) is fitted, and in conjunction therewith, placing the first stator housing part (11) in the intended position for fastening to the fixed part.

13. The method as recited in claim 12, further comprising fastening the first stator housing part (11) to the fixed part (10) in a direction away from the free end (7) of the rotor shaft (6).

14. The method as recited in claim 11, further comprising, after arrangement of the first stator housing part (11) in the intended position, a second stator housing part (21) is arranged around the rotor shaft (6) through a relative movement between the second stator housing part and the rotor shaft so that the second stator housing part is brought from the free end (7) of the rotor shaft in towards the first stator housing part.

15. The method as recited in claim 14, further comprising the second stator housing part (21) being fastened to the first stator housing part (11) in a direction away from the free end (7) of the rotor shaft (6).

16. The method as recited in claim 11, further comprising each of the bearings (8, 9) being arranged around the rotor shaft (6) through a relative movement between the rotor shaft and each bearing, so that the bearing is brought from the free end (7) of the rotor shaft and in towards the rotor disc (3) into a respective bearing position.

* * * * *